United States Patent
Pourzandi et al.

(10) Patent No.: US 11,658,810 B2
(45) Date of Patent: May 23, 2023

(54) CYBER-PHYSICAL CONTEXT-DEPENDENT CRYPTOGRAPHY

(71) Applicant: Telefonaktiebolaget LM Ericsson (publ), Stockholm (SE)

(72) Inventors: Makan Pourzandi, Montreal (CA); Mats Näslund, Bromma (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 814 days.

(21) Appl. No.: 16/081,272

(22) PCT Filed: Mar. 23, 2016

(86) PCT No.: PCT/IB2016/051662
§ 371 (c)(1),
(2) Date: Aug. 30, 2018

(87) PCT Pub. No.: WO2017/163109
PCT Pub. Date: Sep. 28, 2017

(65) Prior Publication Data
US 2021/0194677 A1 Jun. 24, 2021

(51) Int. Cl.
*H04L 9/08* (2006.01)

(52) U.S. Cl.
CPC .......... *H04L 9/0822* (2013.01); *H04L 9/085* (2013.01); *H04L 9/0872* (2013.01)

(58) Field of Classification Search
CPC ...... H04L 9/0822; H04L 9/085; H04L 9/0872
See application file for complete search history.

(56) References Cited

U.S. PATENT DOCUMENTS 6,845,453 B2  1/2005 Scheidt et al.
7,117,426 B2  10/2006 Wu et al.
(Continued)

FOREIGN PATENT DOCUMENTS

WO  WO-2011094931 A1 * 8/2011 ............ H04L 51/02

OTHER PUBLICATIONS

Jarvis, L. et al., "Geolocation of LTE Subscriber Stations Based on the Timing Advance Ranging Parameter," Published 2011, Military Communications Conference (MILCOM 2011), pp. 180-187, Date of Conference: Nov. 7-10, 2011, Baltimore, MD, USA, consisting of 8-pages.
(Continued)

*Primary Examiner* — Jeffrey C Pwu
*Assistant Examiner* — Alex D Carrasquillo
(74) *Attorney, Agent, or Firm* — Christopher & Weisberg, P.A.

(57) ABSTRACT

A method for cryptographic key management for managing access control is provided. A key is divided into a plurality of portions of the key. Pre-encryption contextual data is received for each of a plurality of devices. The pre-encryption contextual data indicates at least one attribute of a respective device of the plurality of devices before an encryption of the plurality of portions of the key is performed. The plurality of portions of the key are encrypted based at least on the pre-encryption contextual data of the plurality of devices to make the plurality of the portions of the key dependent at least on contextual data corresponding pre-encryption contextual data. Each of the plurality of encrypted portions of the key is distributed to a respective device of the plurality of devices for storage and retrieval.

23 Claims, 9 Drawing Sheets

(56) References Cited

U.S. PATENT DOCUMENTS

| | | | | |
|---|---|---|---|---|
| 7,532,723 | B2* | 5/2009 | Chitrapu | H04L 9/3234 380/44 |
| 8,726,019 | B2* | 5/2014 | Paddon | H04L 9/085 713/168 |
| 8,855,318 | B1* | 10/2014 | Patnala | H04L 9/0866 380/279 |
| 9,203,859 | B2* | 12/2015 | Sampigethaya | H04L 63/1433 |
| 9,355,228 | B2* | 5/2016 | Smith, III | G06F 8/65 |
| 9,673,975 | B1* | 6/2017 | Machani | H04L 9/0863 |
| 9,858,925 | B2* | 1/2018 | Gruber | G10L 15/18 |
| 10,516,527 | B1* | 12/2019 | Machani | H04L 9/0894 |
| 10,715,316 | B2* | 7/2020 | Denning | H04L 9/0822 |
| 10,949,556 | B2* | 3/2021 | Signas | H04L 9/088 |
| 2005/0154925 | A1 | 7/2005 | Chitrapu et al. | |
| 2007/0174613 | A1 | 7/2007 | Paddon et al. | |
| 2010/0054481 | A1 | 3/2010 | Jajodia et al. | |
| 2011/0154050 | A1 | 6/2011 | Cordery et al. | |
| 2013/0177152 | A1* | 7/2013 | Scheidt | H04L 9/0861 380/44 |
| 2013/0249690 | A1* | 9/2013 | Hadatsuki | H04M 1/72454 340/540 |
| 2014/0023061 | A1* | 1/2014 | Sakai | H04W 12/033 370/338 |
| 2014/0164790 | A1* | 6/2014 | Dodgson | G06Q 10/10 713/193 |
| 2014/0172365 | A1* | 6/2014 | Hannebutte | G01C 21/20 702/181 |
| 2014/0282933 | A1* | 9/2014 | Etchegoyen | H04L 63/08 726/5 |
| 2014/0329497 | A1 | 11/2014 | Sanzgiri et al. | |
| 2015/0052359 | A1 | 2/2015 | Castillo et al. | |
| 2015/0134418 | A1* | 5/2015 | Leow | G06F 16/29 705/7.34 |
| 2019/0253243 | A1* | 8/2019 | Zimmerman | H04W 4/70 |

OTHER PUBLICATIONS

Anja Bellelien, "Bluetooth Indoor Positioning," Unpublished Master's of Computer Science Thesis, University of Geneva, Switzerland, (Mar. 2012), consisting of 56-pages.

Wang et al., "Bluetooth Positioning Using RSSI and Triangulation Methods," Published 2013, IEEE Consumer Communications and Networking Conference (CCNC), pp. 837-842, Date of Conference: Jan. 11-14, 2013, Las Vegas, NV, USA, consisting of 6-pages.

Wikipedia Secret Sharing obtained from web address https://en.wikipedia.org/wiki/Secret_sharing downloaded from the Internet Jan. 22, 2016 consisting of (7-pages).

Shamir et al., "How to Share a Secret," IP.com Journal, IP.Com, Inc., XP-013119902, Mar. 30, 2007, West Henrietta, NY, USA, consisting of 9-pages.

International Search Report and Written Opinion of the International Searching Authority dated Dec. 9, 2016 and issued in corresponding PCT Application Serial No. PCT/IB2016/051662, consisting of 12-pages.

Zhang et al.. Securing Sensor Networks with Location-Based Keys; 2013 IEEE 10th Consumer Communications and Networking Conference (CCNC); consisting of 6 pages.

DecaWave; Product Information: DW1000; 2013, consisting of 2 pages.

\* cited by examiner ered the U.S. National Stage Patent Application of International
CYBER-PHYSICAL CONTEXT-DEPENDENT CRYPTOGRAPHY

CROSS-REFERENCE TO RELATED APPLICATIONS

This application is a Submission Under 35 U.S.C. § 371 for U.S. National Stage Patent Application of International Application Number: PCT/IB2016/051662, filed Mar. 23, 2016 entitled "CYBER-PHYSICAL CONTEXT-DEPENDENT CRYPTOGRAPHY," the entirety of which is incorporated herein by reference.

TECHNICAL FIELD

The present disclosure relates to cryptography and in particular, to cryptographic key management using information about physical context.

BACKGROUND

There are various existing techniques for safeguarding access control such as data encryption. Many of these existing techniques are based on authentication of the requesting entity using a password or key to establish whether the entity is authorized for access. For data access requests, one existing approach is to encrypt data with a key using a cryptographic algorithm and then grant (or deny) access to the decryption key. Usually such techniques rely on one shared key or one set of public/private keys.

Several protection mechanisms for protecting such key(s), i.e., access key(s), are known in the art. An access key may be an authentication key, a data decryption key, etc. Whenever the access key is compromised, access may be gained such that an identity may be spoofed or the data can be easily decrypted and revealed. The access key is generally stored in a limited number of places such as a Universal Integrated Circuit Card (UICC) card and/or an authentication, authorization and accounting (AAA) server, which may make stealing the access key potentially easy.

One existing solution to the problem of protecting the access key is a technique referred to as secret sharing. In secret sharing, a split key is used in such a way that a certain number of split shares of the key are needed to reconstruct the key. This avoids the single point of failure as more than one shared is needed to reconstruct the key.

However, secret sharing is not without flaws. One problem with this technique is that it involves hiding and securing the individual key shares in order to avoid them from being stolen by attacker. Further, in an enterprise settings such as industry automation, different types of access should be granted to different entities in different situations. For example, an enterprise user should be granted one type of access when he/she is located in the office as compared to when he/she is remotely accessing the company's network. Similarly, an industrial robot may have different access rights depending on where and/or how the robot is deployed in the factory assembly line. Also, the increase in the sheer number of entities, leads to a dramatic increase in the number of access keys and shares that need to be stored. For example, existing secret sharing, discussed above, requires one key to be split into shares, each one being stored in highly secured locations in which a user, robot or entity can have multiple different keys for various situations that are required to be securely produced and stored.

SUMMARY

Some embodiments advantageously provide a method, system and devices for cryptographic key management using physical context.

According to one aspect of the disclosure, an apparatus for cryptographic key management for managing access control is provided. The apparatus includes processing circuitry. The processing circuitry includes a processor and a memory. The memory contains instructions that, when executed by the processor, configure the processor to divide a key into a plurality of portions of the key, receive pre-encryption contextual data for each of a plurality of devices, the pre-encryption contextual data indicating at least one attribute of a respective device of the plurality of devices before an encryption of the plurality of portions of the key is performed, encrypt the plurality of portions of the key based at least on the pre-encryption contextual data of the plurality of devices to make the plurality of the portions of the key dependent at least on contextual data corresponding pre-encryption contextual data, and distribute each of the plurality of encrypted portions of the key to a respective device of the plurality of devices for storage and retrieval.

According to one aspect of this embodiment, the memory contains further instructions that, when executed by the processor, configure the processor to perform a first cryptographic key operation using the key before dividing the key into the plurality of portions of the key. According to another aspect of this embodiment, each device of the plurality of devices receives the encrypted portion of the key that was encrypted using pre-encryption contextual data from the respective device. According to another aspect of this embodiment, the memory includes further instructions that configure the processor to receive post-encryption contextual data for at least one of the plurality of devices and receive at least one of the plurality of encrypted portions of the key. The post-encryption contextual data indicates at least one attribute of a respective device of the plurality of devices after the encryption of the plurality of portions of the key is performed. The memory includes further instructions that configure the processor to generate a reconstructed key based on the post-encryption contextual data for at least one of the plurality of devices and the received at least one of the plurality of encrypted portions of the key. The reconstructed key corresponds to the key if at least a portion of the post-encryption contextual data corresponds to the pre-encryption contextual data.

According to another aspect of this embodiment, the reconstructed key corresponds to the key if a threshold number of encrypted portions of the key are received. According to another aspect of this embodiment, the reconstructed key corresponds to the key if at least a threshold amount of post-encryption contextual data corresponds to the pre-encryption contextual data. According to another aspect of this embodiment, the at least one attribute indicated by the post-encryption contextual data corresponds to at least one physical measurement performed by a respective device of the plurality of devices.

According to another aspect of this embodiment, the at least one attribute indicated by the post-encryption contextual data corresponds to at least one status of a respective device of the plurality of devices. According to another aspect of this embodiment, the memory contains further instructions that, when executed by the processor, configure the processor to perform a second cryptographic key operation using reconstructed key if the reconstructed key corresponds to the key, the second cryptographic key operation being related to the first cryptographic key operation.

According to another aspect of this embodiment, the second cryptographic key operation is configured to allow access to at least one resource associated with at least one device of the plurality of devices if the reconstructed key corresponds to the key. According to another aspect of this embodiment, the at least one attribute indicated by the pre-encryption contextual data corresponds to at least one of a physical measurement and status of device determination performed by a respective device of the plurality of devices. According to another aspect of this embodiment, the at least one attribute indicated by the pre-encryption contextual data corresponds to at least one potential attribute of a respective device of the plurality of devices that is provided by at least one user.

According to another aspect of the disclosure, a method for cryptographic key management for managing access control is provided. A key is divided into a plurality of portions of the key. Pre-encryption contextual data is received for each of a plurality of devices. The pre-encryption contextual data indicates at least one attribute of a respective device of the plurality of devices before an encryption of the plurality of portions of the key is performed. The plurality of portions of the key are encrypted based at least on the pre-encryption contextual data of the plurality of devices to make the plurality of the portions of the key dependent at least on contextual data corresponding pre-encryption contextual data. Each of the plurality of encrypted portions of the key is distributed to a respective device of the plurality of devices for storage and retrieval.

According to one aspect of this embodiment, a first cryptographic key operation is performed using the key before dividing the key into the plurality of portions of the key. According to another aspect of this embodiment, each device of the plurality of devices receives the encrypted portion of the key that was encrypted using pre-encryption contextual data from the respective device.

According to another aspect of this embodiment, post-encryption contextual data for at least one of the plurality of devices is received. the post-encryption contextual data indicates at least one attribute of a respective device of the plurality of devices after the encryption of the plurality of portions of the key is performed. At least one of the plurality of encrypted portions of the key is received. A reconstructed key is generated based on the post-encryption contextual data for at least one of the plurality of devices and the received at least one of the plurality of encrypted portions of the key. The reconstructed key corresponds to the key if at least a portion of the post-encryption contextual data corresponds to the pre-encryption contextual data.

According to another aspect of this embodiment, the reconstructed key corresponds to the key if a threshold number of encrypted portions of the key are received. According to another aspect of this embodiment, the reconstructed key corresponds to the key if at least a threshold amount of post-encryption contextual data corresponds to the pre-encryption contextual data. According to another aspect of this embodiment, the at least one attribute indicated by the post-encryption contextual data corresponds to at least one physical measurement performed by a respective device of the plurality of devices.

According to another aspect of this embodiment, the at least one attribute indicated by the post-encryption contextual data corresponds to at least one status of a respective device of the plurality of devices. According to another aspect of this embodiment, a second cryptographic key operation is performed using the reconstructed key if the reconstructed key corresponds to the key. The second cryptographic key operation is related to the first cryptographic key operation. According to another aspect of this embodiment, the second cryptographic key operation is configured to allow access to at least one resource associated with at least one device of the plurality of devices if the reconstructed key corresponds to the key. According to another aspect of this embodiment, the at least one attribute indicated by the pre-encryption contextual data corresponds to at least one of a physical measurement and status of device determination performed by a respective device of the plurality of devices. According to another aspect of this embodiment, the at least one attribute indicated by the pre-encryption contextual data corresponds to at least one potential attribute of a respective device of the plurality of devices that is provided by at least one user.

According to another aspect of the disclosure, an apparatus for cryptographic key management for managing access control is provided. The apparatus is configured to communicate with at least one of a plurality of devices. Each of the plurality of devices includes a respective encrypted portion of a plurality of encrypted portions of a key that was encrypted based at least one pre-encryption contextual data of a respective device of the plurality of devices to make the plurality of the portions of the key dependent at least on contextual data corresponding to pre-encryption contextual data. The pre-encryption contextual data indicates at least one attribute of a respective device of the plurality of devices before the encryption of the portions of the key is performed. The apparatus includes processing circuitry. The processing circuitry includes a processor and a memory, the memory containing instructions that, when executed by the processor, configure the processor to receive post-encryption contextual data for at least one of the plurality of devices. The post-encryption contextual data indicates at least one attribute of a respective device of the plurality of devices after the encryption of the portions of the key is performed. The memory contains further instruction that, when executed by the process, configure the processor to receive at least one of the plurality of encrypted portions of the key and generate a reconstructed key based on the post-encryption contextual data for at least one of the plurality of devices and the received at least one of the plurality of encrypted portions of the key. The reconstructed key corresponds to the key if at least a portion of the post-encryption contextual data corresponds to the pre-encryption contextual data.

According to one aspect of this embodiment, the reconstructed key corresponds to the key if a threshold number of encrypted portions of the key are received. According to another aspect of this embodiment, the reconstructed key corresponds to the key if at least a threshold amount of post-encryption contextual data corresponds to the pre-encryption contextual data. According to another aspect of this embodiment, the at least one attribute indicated by the post-encryption contextual data corresponds to at least one physical measurement performed by a respective device of the plurality of devices.

According to another aspect of this embodiment, the at least one attribute indicated by the post-encryption contextual data corresponds to at least one status of a respective device of the plurality of devices. According to another aspect of this embodiment, the memory contains further instructions that, when executed by the processor, configure the processor to perform a cryptographic key operation using the reconstructed key if the reconstructed key corresponds to the key. According to another aspect of this embodiment, the cryptographic key operation is configured to allow access to at least one resource associated with at least one device of the plurality of devices if the reconstructed key corresponds to the key.

According to another aspect of this embodiment, the at least one attribute indicated by the pre-encryption contextual data corresponds to at least one of a physical measurement and status of device performed by a respective device of the plurality of devices. According to another aspect of this embodiment, the at least one attribute indicated by the pre-encryption contextual data corresponds to at least one potential attribute of a respective device of the plurality of devices that is provided by at least one user.

According to another aspect of the disclosure, a method for cryptographic key management for managing access control is provided. Each of a plurality of devices includes a respective encrypted portion of a plurality of encrypted portions of a key that was encrypted based at least one pre-encryption contextual data of a respective device of the plurality of devices to make the plurality of the portions of the key dependent at least on contextual data corresponding to pre-encryption contextual data. The pre-encryption contextual data indicates at least one attribute of a respective device of the plurality of devices before the encryption of the portions of the key is performed. Post-encryption contextual data is received for at least one of the plurality of devices. The post-encryption contextual data indicates at least one attribute of a respective device of the plurality of devices after the encryption of the portions of the key is performed. At least one of the plurality of encrypted portions of the key is received. A reconstructed key is generated based on the post-encryption contextual data for at least one of the plurality of devices and the received at least one of the plurality of encrypted portions of the key. The reconstructed key corresponds to the key if at least a portion of the post-encryption contextual data corresponds to the pre-encryption contextual data.

According to one aspect of this embodiment, the reconstructed key corresponds to the key if a threshold number of encrypted portions of the key are received. According to another aspect of this embodiment, the reconstructed key corresponds to the key if at least a threshold amount of post-encryption contextual data corresponds to the pre-encryption contextual data. According to another aspect of this embodiment, the at least one attribute indicated by the post-encryption contextual data corresponds to at least one physical measurement performed by a respective device of the plurality of devices.

According to another aspect of this embodiment, the at least one attribute indicated by the post-encryption contextual data corresponds to at least one status of a respective device of the plurality of devices. According to another aspect of this embodiment, a cryptographic key operation is performed using the reconstructed key if the reconstructed key corresponds to the key.

According to another aspect of this embodiment, the cryptographic key operation is configured to allow access to at least one resource associated with at least one device of the plurality of devices if the reconstructed key corresponds to the key. According to another aspect of this embodiment, the at least one attribute indicated by the pre-encryption contextual data corresponds to at least one of a physical measurement and status of device performed by a respective device of the plurality of devices. According to another aspect of this embodiment, the at least one attribute indicated by the pre-encryption contextual data corresponds to at least one potential attribute of a respective device of the plurality of devices that is provided by at least one user.

According to another aspect of the disclosure, an apparatus for cryptographic key management for managing access control is provided. The apparatus includes an key distribution module configured to encrypt data using a key to generate encrypted data, divide the key into a plurality of portions of the key and receive pre-encryption contextual data for each of a plurality of devices. The pre-encryption contextual data indicates at least one attribute of a respective device of the plurality of devices before an encryption of the plurality of portions of the key is performed. The key distribution module is further configured to encrypt the plurality of portions of the key based at least on the pre-encryption contextual data of the plurality of devices to make the plurality of the portions of the key dependent at least on contextual data corresponding pre-encryption contextual data, and distribute each of the plurality of encrypted portions of the key to a respective device of the plurality of devices for storage and retrieval.

According to another aspect of the disclosure, an apparatus for cryptographic key management for managing access control is provided. Each of a plurality of devices includes a respective encrypted portion of a plurality of encrypted portions of a key that was encrypted based at least on the pre-encryption contextual data of the plurality of devices to make the plurality of the portions of the key dependent at least on contextual data corresponding pre-encryption contextual data. The pre-encryption contextual data indicates at least one attribute of a respective device of the plurality of devices before the encryption of the portions of the key is performed. The apparatus includes a key reconstruction module configured to receive post-encryption contextual data for at least one of the plurality of devices. The post-encryption contextual data indicates at least one attribute of a respective device of the plurality of devices after the encryption of the portions of the key is performed. The key reconstruction module is further configured to receive at least one of the plurality of encrypted portions of the key and generate a reconstructed key based on: the post-encryption contextual data for at least one of the plurality of devices and the received at least one of the plurality of encrypted portions of the key. The reconstructed key corresponds to the key if at least a portion of the post-encryption contextual data corresponds to the pre-encryption contextual data.

According to another aspect of the disclosure, a method for cryptographic key management for managing access control is provided. A first cryptographic key operation is performed using a key. The key is divided into a plurality of portions of the key. Pre-encryption contextual data is received for each of a plurality of devices. The pre-encryption contextual data indicates at least one attribute of a respective device of the plurality of devices before an encryption of the plurality of portions of the key is performed. The plurality of portions of the key are encrypted based at least on the pre-encryption contextual data of the plurality of devices to make the plurality of the portions of the key dependent at least on contextual data corresponding pre-encryption contextual data. Each of the plurality of encrypted portions of the key are distributed to a respective device of the plurality of devices for storage and retrieval. At least one of the plurality of encrypted portions of the key is received. Post-encryption contextual data is received for at least one of the plurality of devices. The post-encryption contextual data indicates at least one attribute of a respective device of the plurality of devices after the encryption of the plurality of portions of the key is performed. A reconstructed key is generated based on the post-encryption contextual data for at least one of the plurality of devices and the received at least one of the plurality of encrypted portions of the key. A second cryptographic key operation is performed using the reconstructed key if the reconstructed key corresponds to the key. The second cryptographic key operation is related to the first cryptographic key operation.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
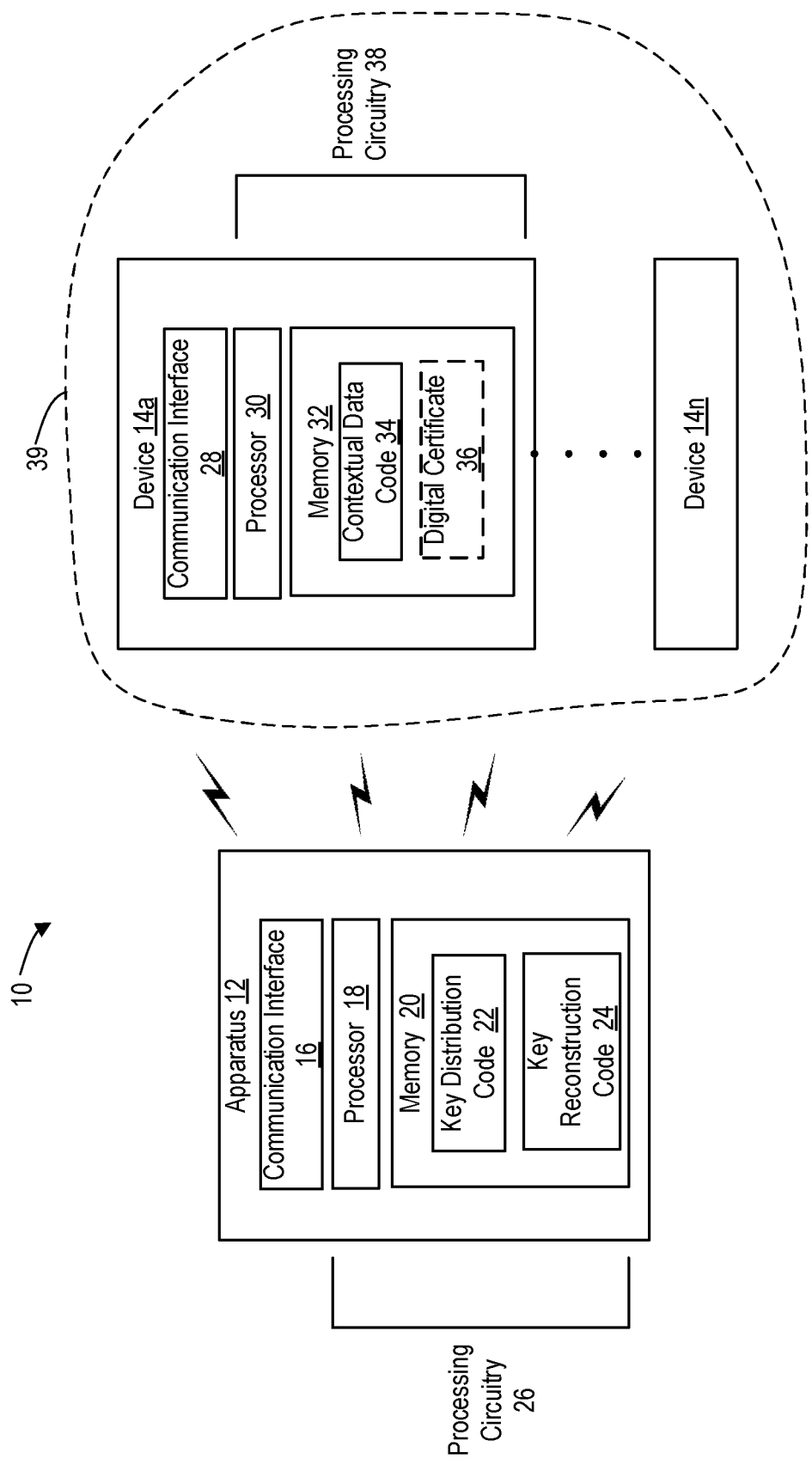
FIG. 1 is a block diagram of an exemplary system for cryptographic key management in accordance with the principles of the disclosure.

The disclosure relates to a physical context-dependent storage system that takes in to account one or more contextual parameters/attributes/characteristics under which a key operation should be performed. For example, in an industrial environment, Internet of Things (IoT) devices are used for securely storing data by separating access key storage from data storage. Further, the disclosure describes encryption using secret sharing based on cyber physical dependencies to secure the secret shares, thereby making secret sharing more secure. The addition of cyber physical dependencies/context to the secret sharing method makes a successful attacks or accidental leakage of the key more difficult and/or unlikely.

In other words, the disclosure provides an access control process based on digital security mechanisms but also adds cyber physical elements, thereby augmenting the digital security by mixing it with more physical security. In one or more embodiments, this is done by introducing cyber physical context (CPC) such that not only must the attacker breach the digital security for multiple devices in the IoT, but the attacker needs to obtain (or guess) the CPC that was used by at least some of the devices at the time of key generation (encryption of the key portions). This adds cyber physical knowledge necessary to compromise the storage in the devices. For example, the attacker is required to know the chosen CPC and devices' CPCs at the time of encryption, which means that the attacker must go through an additional step in his attack to monitor/steal/find the target devices' CPCs at the time of encryption. Therefore, even in situations where there is limited devices and/or variety of CPCs, the overall security is increased as the attacker must consider all possible CPCs for all the devices, and must also compromise different devices to find secret shares. Further, in one or more embodiments, threshold secret sharing with cyber physical context is implemented to make the scheme more robust for an end-user. For example, even if some of the devices of the IoT stop working, produce wrong measurements or lose their memory, the other device's shares will be sufficient for key reconstruction.

Before describing in detail exemplary embodiments, it is noted that the embodiments reside primarily in combinations of apparatus components and processing steps related cryptographic key management. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for cryptographic key management in accordance with the principles of the disclosure and designated generally as "10." System 10 includes one or more apparatuses 12 and one or more devices 14a-14n or 14(i) where i=0,1,2, . . . etc. (collectively referred to as device 14) in communication with each other via one or more communication links, paths and/or networks. Further, in one or more embodiments, apparatus 12 and/or device 14 are in communication with one or more remote servers (not shown and collectively referred to as remote server) that may perform one or more apparatus 12 and/or device 14 functions described herein. Although FIG. 1 shows a single apparatus 12, it is understood that implementations of system 10 are not limited to a single apparatus. It is contemplated that the functions described herein with respect to apparatus 12 may be divided or distributed among multiple apparatuses 12. Apparatus 12 includes communication interface 16 for communicating with device 14, other apparatuses 12, remote server and/or other entities in system 10 via one or more communication protocols. In one or more embodiments, communication interface 16 is replaced with one or more transmitters, i.e., transmitter circuitry, and/or one or more receivers, i.e., receiver circuitry for performing communication interface functions described herein. Apparatus 12 includes one or more processors 18 for performing apparatus 12 functions described herein.

Apparatus 12 includes memory 20 that is configured to store data, programmatic software code and/or other information described herein. Memory 20 is configured to store key distribution code 22 and key reconstruction code 24. For example, key distribution code 22 includes instructions that, when executed by processor 18, cause processor 18 to perform the key distribution process discussed in detail with respect to FIGS. 2 and 3. In another example, key reconstruction code 24 includes instructions that, when executed by processor 18, causes processor 18 to perform the key reconstruction process discussed in detail with respect to FIGS. 4 and 5. In one or more embodiments, apparatus 12 may be a mobile device, robot or other entity capable of perform apparatus 14 functions described herein.

In one or more embodiments, processor 18 and memory 20 form processing circuitry 26. In addition to a traditional processor and memory, processing circuitry 26 may comprise integrated circuitry for processing and/or control, e.g., one or more processors and/or processor cores and/or FPGAs (Field Programmable Gate Array) and/or ASICs (Application Specific Integrated Circuitry). Processor 18 may be configured to access (e.g., write to and/or reading from) memory 20, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 20 may be configured to store code executable by processor 18 and/or other data, e.g., data pertaining to communication, e.g., configuration and/or address data of devices/entities, etc. Processing circuitry 26 may be configured to control any of the methods and/or processes described herein and/or to cause such methods and/or processes to be performed, e.g., by apparatus 12. Corresponding instructions may be stored in memory 20, which may be readable and/or readably connected to processor 18.

Device 14 includes communication interface 28, processor 30 and memory 32 that correspond to communication interface 16, processor 18 and memory 20 but with size and performance varying based on design need. In particular, memory 32 is configured to store contextual data code 34. For example, contextual data code 34 includes instructions that, when executed by processor 30, causes processor 30 to perform the storage and contextual data sharing process discussed in detail with respect to FIG. 6. In one or more embodiments, memory 32 stores digital certificate 36 for device verification as described herein.

In one or more embodiments, processing 30 and memory 32 form processing circuitry 38. In addition to a traditional processor and memory, processing circuitry 38 may comprise integrated circuitry for processing and/or control, e.g., one or more processors and/or processor cores and/or FPGAs (Field Programmable Gate Array) and/or ASICs (Application Specific Integrated Circuitry). Processor 30 may be configured to access (e.g., write to and/or reading from) memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 32 may be configured to store code executable by processor 30 and/or other data, e.g., data pertaining to communication, e.g., configuration and/or address data of devices, etc. Processing circuitry 38 may be configured to control any of the methods and/or processes described herein and/or to cause such methods and/or processes to be performed, e.g., by device 14. In one or more embodiments, devices 14 form an Internet of Things (IoT) 39 that may include various devices such as any entity, sensor, tablet, robot, etc. that uses wireless or other access technology to connect to other devices 14 and/or remote servers. For example, in one or more embodiments, sensor may include environmental sensors for location, positioning, temperature, humidity, etc. such as for building automation, and/or industry specific application sensors for measuring the position and/or tilt of a robot arm, etc. In one or more embodiments, device 14 may be physically located on or in apparatus 12.

Figure 2:
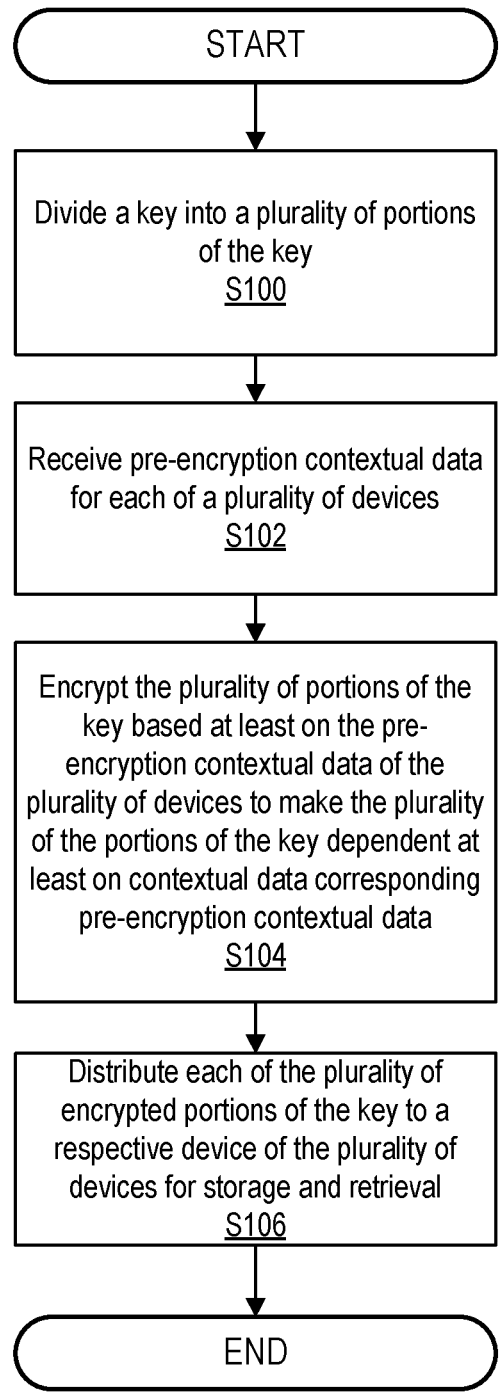
FIG. 2 is a flow diagram of an exemplary key distribution process in accordance with the principle of the disclosure.

FIG. 2 is a flow diagram of an exemplary key distribution process of key distribution code 22. Processing circuitry 26 divides a key into a plurality of portions, i.e., a plurality of portions of the key (Block S100). For example, key K is divided into a plurality of shares (s_i). In one or more embodiments, processing circuitry 26 divides the key into n shares where n is the number of devices 14 such that s1, s2, . . . , sn shares of the key are generated, and each device 14 receives a respective share of the key. In one or more embodiments, the key is a cryptographic key. In one or more embodiments, the key is one of an encryption/decryption key, a data integrity key, entity authentication key or some other form of cryptographic key.

Processing circuitry 26 receives pre-encryption contextual data of each of devices 14 (Block S102). The pre-encryption contextual data indicates at least one attribute of a respective device 14 of the plurality of devices 14 before an encryption of the plurality of portions of the key is performed. In one or more embodiments, at least one attribute indicated by the pre-encryption contextual data includes at least one of a status of device 14, physical measurement performed by device 14 and potential attribute of device 14, among other data that is determinable and/or measurable by device 14. The physical measurement refers to a measurement performed by device 14 using one or more sensors and/or measurement data received by device 14. In one or more embodiments, the physical measurement includes a physical location measurement, temperature measurement, humidity measurement, at least one actuator position measurement and physical position relative to apparatus 12 measurement, among other measurements that can be performed by device 14. The status of device 14 refers to one or more attributes of device 14 that are determinable by device 14 such as ON, OFF, running, operating, software version, device identity, HDMI port 3 in use, WiFi ON, etc.

Potential attribute of device 14 refers to a user defined or predefined attribute that is set and may correspond to an attribute to be determined or measured by device 14 at a later time, e.g., after the encryption of the key is performed or when post-encryption contextual data is requested. For example, potential attribute of device 14 may corresponds to device 14 potential status of device 14="working" and/or a potential physical measurement taken by device 14="15 m" from apparatus 12. For pre-encryption contextual data to correspond to post-encryption context data in this example, the post-encryption context data received from device 14 must indicate status of device 14="working" and the physical measurement from apparatus 12 taken by device 14=15 m. In one or more other embodiments, apparatus 12 receives user defined pre-encryption contextual data for one or more devices. For example, processing circuitry, via communication interface 16 may receive pre-encryption contextual data for device 14 from a user via a user device or input device associated with apparatus 12. In another example, the user defined pre-encryption contextual data is received from a remote server. In one or more embodiments, the potential attribute is used if device 14 is offline and thus cannot determine and communicate pre-encryption contextual data.

In one or more embodiments, the pre-encryption contextual data of device 14 indicates multiple attributes such as one or more physical measurements, one or more statuses of device 14, one or more potential attributes, or a combination thereof. For example, pre-encryption contextual data for device 14 may indicate at least one physical measurement performed by device 14 and at least one potential attribute such as a potential status of device 14. In one or more embodiments, the one or more attributes indicated by pre-encryption contextual data includes measurable or determinable characteristics of device 14.

In one or more embodiments, processing circuitry 26 receives pre-encryption contextual data from one or more devices 14 such as by requesting the pre-encryption contextual data from the one or more devices 14. For example, apparatus 12 request pre-encryption contextual data from device 14 in which the request will trigger device 14 to acquire the pre-encryption contextual data, as discussed in detail with respect to FIG. 6.

Processing circuitry 26 encrypts the plurality of portions of the key based at least on the pre-encryption contextual data of the plurality of devices to make the plurality of the portions of the key dependent at least on contextual data corresponding to pre-encryption contextual data (Block S104). In one or more embodiments, processing circuitry 26 creates encrypted portions of the key in which a respective portion of the key is encrypted using pre-encryption contextual data from respective device 14 as an input to a cryptographic function. For example, processing circuitry 26 generates cyber-physical context (CPC) dependent shares (CDS), i.e., encrypted portions of the shares of the key, CDS(1), CDS(2), . . . CDS(n) defined by equation (1):

$$CDS(i)=F(\text{hash}(K\_i\|CPC(i)),s\_i) \qquad (1)$$

where:

K_i is a pre-configured shared key between device 14(i) and apparatus 12, or a key established as part of a TLS connection between device 14(i) and apparatus 12;

F(k,x) is a key-dependent crypto function such as AES or other crypto function known in the art;

CPC(i) is an attribute indicated by the pre-encryption contextual data of device 14(i);

s_i is the share i of the split/divided key.

In one or more embodiments, K_i may be omitted based on design need.

In one or more embodiments, CPC(i) corresponds to a location, a geographic position, or a distance from apparatus 12, i.e., placement of apparatus 12 from the point of view of devices 14. For example, CPC(1) of device 14(1) or 14a is apparatus 12 is "twelve meters" away from device 14(1) placement and CPC(2) of device 14(2) or 14b is apparatus 12 is "three meters" away from device 14b. In other words, CPC(i) may be an indication of the distance between device 14 and apparatus 12, or device 14 and another entity in system 10. In other words, security, in this example, is based on devices 14 and apparatus 12 placements from each other being only known to user(s) and also based on the physical access to devices 14 and apparatus 12 in the premises. In one or more embodiments, CPC(i) corresponds a status of device 14(i). For example, CPC(i) may equal "running" such that all or at least a threshold amount of devices 14 must being in running mode in order to perform a key operation such as decryption, access data, access control, etc. (as discussed below).

In one or more embodiments, CDS(i) is based on multiple attributes, i.e., multiple CPC(i)s of device 14(i). For example, in one embodiment, CPC_1(i) and CPC_2(i) of device 14(i) are used where CPC_1(i) is a distance measurement from apparatus 12 to device 14(i) and CPC_2(i) is the status of device 14(i). In this case, CDS(i) is defined by equation (2):

$$CDS(i)=F(\text{hash}(K\_i\|CPC\_1(i)\|CPC\_2(i)),s\_i) \qquad (2)$$

In one example, CPC_1(i) is status="running" and CPC_2(i) is seven meters from apparatus 12, i.e., a specific distance measurement performed by device 14(i). By mixing the attributes of device 14(i) for inputs into the cryptographic function for encryption of the portions of the shares of the key, makes proper decryption, i.e., second key operation (discussed below), possible when device 14(i) later reports that it is "running" and its distance form apparatus 12 is seven meters from apparatus 12, as discussed below in FIG. 4. The distance of seven meters from apparatus 12 could correspond to apparatus 12 being in a specific office in a building such as a supervisor's office as described with respect to the example of FIGS. 9-10. While this example illustrates using two CPCs of device 14(i), more than two CPCs of device 14(i) may be used. Further, the number of CPCs of device 14 used for inputs for encryption may vary from one or more other devices 14. In one or more embodiments, the type of attribute indicated by the CPC may vary among devices 14.

Processing circuitry 26 distributes each of the plurality of encrypted portions of the key to a respective device of the plurality of devices for storage and retrieval, i.e., each device 14 of the plurality of devices 14 receives the encrypted portion of the key that was encrypted using pre-encryption contextual data from the respective device 14 (Block S106). In one or more embodiments, an encrypted portion of the key is distributed to a specific device 14 whose pre-encryption contextual data was used as an input to encrypt this portion of the key. For example, encrypted portion CDS(1)=F (hash(K_1∥CPC(1)), s_1) is distributed to device 14(1) while encrypted portion CDS(2)=F (hash(K_2∥CPC(2)), s_2) is distributed to device 14(2) and so on. In one or more embodiments, the encrypted share received at device 14 is securely stored. In one or more embodiments, device 14 is configured to not store what pre-encryption contextual data was used as an input to a crypto function to encrypt key share s_i such that device 14 is not able to reveal the pre-encryption contextual data to an attacker/hacker. For example, device 14 may be configured to explicitly erase one or more pre-encryption contextual data after the corresponding encrypted portions have been produced, after the pre-encryption contextual data has been transmitted to apparatus 12, or after another event described herein. Even if the attacker was to steal the encrypted portion of the key from device 14, the encrypted portion of the key is useless without the contextual data CPC(i) that is needed to reconstruct the key, and that is not known to device 14.

Figure 3:
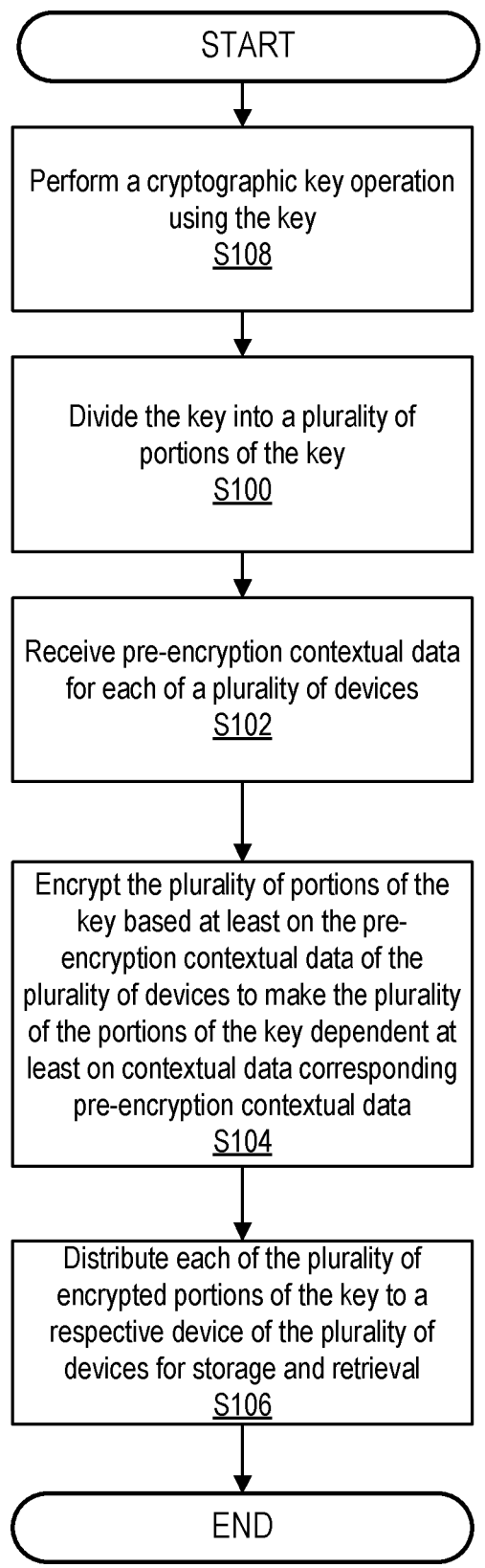
FIG. 3 is a flow diagram of another exemplary key distribution process in accordance with the principle of the disclosure.

FIG. 3 is a flow diagram of another embodiment of the exemplary key distribution process of key distribution code 22 in accordance with the principles of the disclosure. Processing circuitry 26 performs a cryptographic key operation using the key (Block S108). In one or more embodiments, processing circuitry 26 performs a first cryptographic key operation using the key before dividing the key into the plurality of portions of the key. In one or more embodiments, the first cryptographic key operation includes: encrypting data using the key to generate encrypted data, access control using the key, and authentication and integrity protection, among other operations that may be performed using the key. Processing circuitry 26 performs Blocks S100-S104 as discussed above with respect to FIG. 2.

Figure 4:
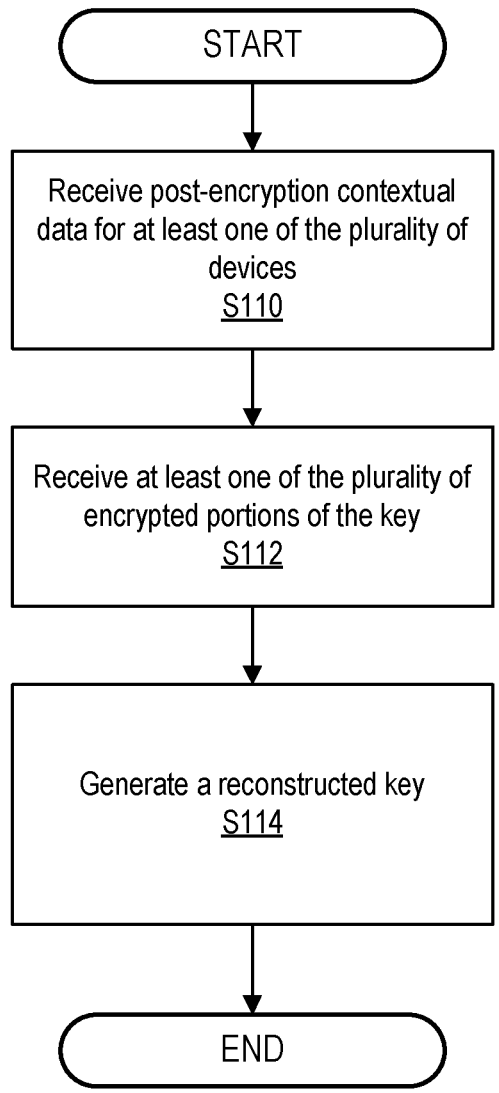
FIG. 4 is a flow diagram of one embodiment of an exemplary key reconstruction process in accordance with the principles of the disclosure.

FIG. 4 is a flow diagram of one embodiment of an exemplary key reconstruction process of key reconstruction code 24 in accordance with the principles of the disclosure. In particular, the key reconstruction process will generate a reconstructed key in which the reconstructed key will correspond to the key in Block S100 depending on the pre-encryption contextual data, i.e., CPC(i), and post-encryption contextual data, i.e., CPC(i)', as discussed below. In one or more embodiments, the key reconstruction process is initiated in response to a request for a resource such as encrypted data, authenticated access, authorized access or other resource from a user or other entity in system 10.

Processing circuitry 26 receives post-encryption contextual data, i.e., CPC(i)', for at least one of the plurality of devices 14 (Block S110). In one or more embodiments, post-encryption contextual data is received from at least one of the plurality of devices 14. Continuing the two device example above, processing circuitry 26 may receive CPC(1)' from device 14(1) and/or CPC(2)' from device 14(2). In one or more embodiments, the post-encryption contextual data indicates at least one attribute of a respective device 14 of the plurality of devices 14 after the encryption of the plurality of portions of the key is performed. In one or more embodiments, post-encryption contextual data is determined and communicated from one or more individual devices 14 in response to a request as described in detail with respect to FIG. 6. In one or more embodiments, the at least one attribute of device 14 indicated by the post-encryption contextual data includes at least one of a physical measurement and status of device 14, as described above. Processing circuitry 26 may be triggered to communicate, via communication interface 16, one or more requests for post-encryption contextual data to the one or more devices 14 in response to an indication that a cryptographic key operation is to be performed. In particular, in one or more embodiments, post-encryption contextual data is received from all devices 14, e.g., one or more devices 14 may be offline, unable to communicate with apparatus 12 or not functioning properly. In one or more embodiments, post-encryption contextual data is received from less than all of the devices 14.

Processing circuitry 26 receives at least one of the plurality of encrypted portions of the key (Block S112). Continuing the two device example above, processing circuitry 26 may receive CDS(1) from device 14(1) and/or CDS(2) from device 14(2). In one or more embodiments, the encryption portions of the key are received from all devices 14. In one or more other embodiments, the encrypted portions of the key are received from less than all devices 14. In one or more embodiments, processing circuitry 26 requests a respective encrypted portion of the key from each device 14 via the same request for post-encryption contextual data or a different request, i.e., device 14 responds to apparatus 12's request(s) by communicating both CDSi and CPC(i)'.

Processing circuitry 26 generates a reconstructed key (Block S114). In one or more embodiments, processing circuitry 26 generates a reconstructed key based on CDS(i) and CPC(i)' received from one or more devices 14. In particular, in one or more embodiments, if CPC(i) equals CPC(i)', then processing circuitry 26 can correctly invert function F( ) in equation 1 using CPC(i) as a key to obtain s_i, i.e., decrypted portion of the key. In one or more embodiments, the reconstructed key (Block S114) will corresponds to the key (Block S100 and/or Block S108) if CPC(i) corresponds to CPC(i)' for all devices 14(i). In one or more other embodiments, using threshold secret sharing, the reconstructed key (Block S114) will correspond to the key (Block S100 and/or Block S108) if a threshold amount of CPC(i) corresponds to CPC(i)', i.e., if a threshold amount of devices 14 communicate CPC(i)' that corresponds with CPC(i) and/or if a threshold number of encrypted portions of the key are received. In other words, given at least a threshold amount (t) of correct s_i values, K_tcc (the key or access key) can be reconstructed in using known methods. The threshold secret sharing scheme may be a Shamir's scheme, Blakely's scheme or other scheme that is well known in the art. In one or more embodiments, if the requested resource is other than encrypted data, apparatus 12 uses K_tcc to authenticate or gain authorization for access such as to allow access to at least one resource associated with at least one device 14 of the plurality of devices 14 if the reconstructed key corresponds to the key.

Figure 5:
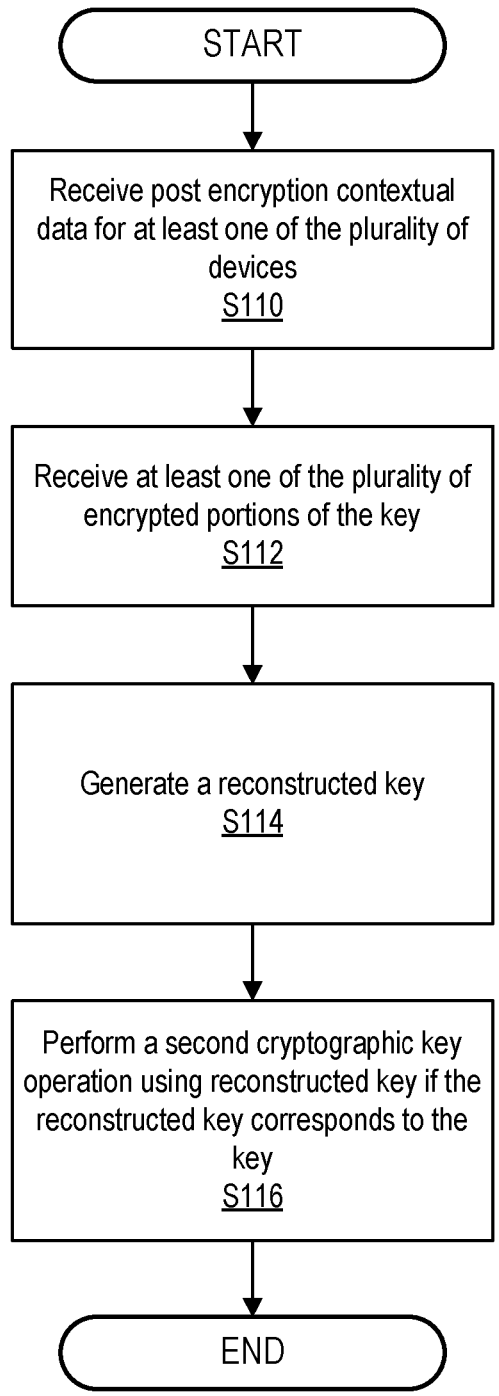
FIG. 5 is a flow diagram of another exemplary key reconstruction process in accordance with the principles of the disclosure.

FIG. 5 is a flow diagram of another exemplary key reconstruction process of key reconstruction code 24 in accordance with the principles of the disclosure. Blocks S110-S114 are discussed above with respect to FIG. 4. Processing circuitry 26 performs a cryptographic key operation using the reconstructed key (Block S116). In one or more embodiments, the cryptographic key operation using the reconstructed key includes decrypting encrypted data in which the encrypted data was generated using the key before it was divided into shares. In one or more embodiments, the cryptographic key operation, i.e., second cryptographic key operation, using the restricted key includes performing an inverse/reciprocal or otherwise related operation to the a key operation performed using the key before it was divided into shares, i.e., an inverse/reciprocal or otherwise related operation to the first key operation. In one or more embodiments, the second cryptographic key operation is related to the first cryptographic key operation. For example, in one embodiment, the first cryptographic key operation is generating a signature while the second cryptographic key operation is verifying the signature. In another example, in one embodiment, the first cryptographic key operation includes encrypting while the second cryptographic key operation includes decryption.

Figure 6:
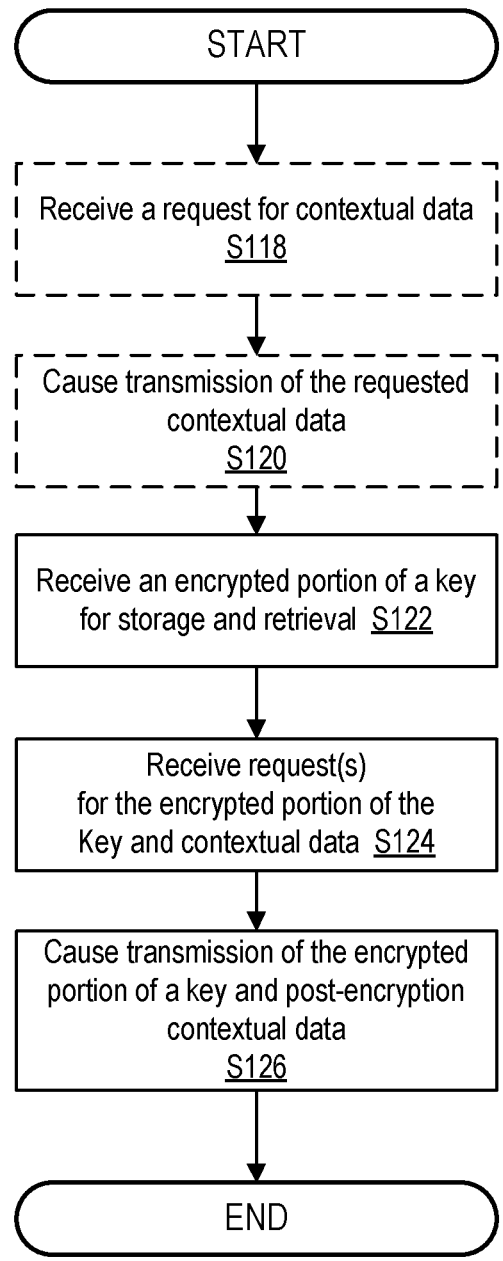
FIG. 6 a flow diagram of an exemplary storage and contextual data sharing process in accordance with the principles of the disclosure.

FIG. 6 illustrates a flow diagram of an exemplary storage and contextual data sharing process of contextual code 34 in accordance with principles of the disclosure. In one or more embodiments, contextual code 34 is installed on device 12 such that other software on device 12 is upgradable without affecting contextual code 34 and stored data associated with contextual code 34, i.e., contextual code 34 keeps encrypted portions of the key from being affected or modified by different device 12 updates. In one or more embodiments, device 12 is configured with a shared key K_i that is shared with apparatus 12 and/or a key pair (Kpriv_i, Kpub_i) such that the key pair may be used to establish a secure connection, e.g., TLS connection, with apparatus 12 in order to provide added security to the contextual data sharing process, i.e., provides added integrity and confidentiality of the process. In one or more embodiments, short range communication protocols such as Near Field Communication (NFC) or Bluetooth is used to exchange these keys between device 14 and apparatus 12, although other secure communication protocols and/or methods known in the art may be used to exchange keys.

Processing circuitry 38 receives a request for contextual data (Block S118). For example, in one embodiment, processing circuitry 38 receives a request for contextual data, via communication interface 28, from apparatus 12. Processing circuitry 38 causes the transmission of the requested contextual data, i.e., pre-encryption contextual data (Block S120). In one or more embodiments, in response to the received request, processing circuitry 38 determines the requested contextual data, e.g., via measurement(s) and/or determination(s), and transmits this contextual data to the requesting entity, e.g., apparatus 12. For example, the determined contextual data corresponds to at least one measurement and/or determination made at a specific time or time period, i.e., a time/time periods before encryption of the portions of the key/pre-encryption contextual data. However, in one or more embodiments, Blocks S118 and S120 are omitted based on design need or if contextual data is input by the user.

Processing circuitry 38 receives an encrypted portion of a key for storage and retrieval (Block S122). In one or more embodiments, processing circuitry 38 receives a respective encrypted portion of the key that was encrypted using the contextual data of Block S120. For example, device 14(1) receives encrypted portion CDS(1)=F (hash(K_1||CPC(1)), s_1) if one attribute/CPC is used. In one or more embodiments, the received encrypted portion of the key is stored in memory 32. For example, each of the plurality of devices 14 includes a respective encrypted portion of a plurality of encrypted portions of a key that was encrypted based at least one pre-encryption contextual data of respective device 14 of the plurality of devices 14, thereby making the plurality of the portions of the key dependent at least on contextual data corresponding to pre-encryption contextual data.

Processing circuitry 38 receives, via communication interface 28, at least one request for the encrypted portion of the key and for contextual data (Block S124). For example, apparatus 12 may be requesting the encrypted portion of the key stored in memory 32 and may also be requesting the determination and transmission of contextual data. Processing circuitry 38 causes transmission of the encrypted portion of the key and the contextual data, i.e., post encryption contextual data, via communication interface 28 to apparatus 12 or requesting entity (Block S126). In one or more embodiments, processing circuitry 38, in response to receiving the request for the encrypted portion of the key and contextual data, determines the requested contextual data, e.g., via measurement(s) and/or determination(s), and transmits this determined contextual data to the requesting entity, e.g., apparatus 12. For example, processing circuitry 38 causes transmission, via communication interface 28, of CDS(i) and CPC(i)' associated with device 14(i) to the requested entity, e.g., apparatus 12. The determined and transmitted contextual data of Block S126 corresponds to at least one measurement and/or determination made at a specific time or time period, i.e., a time/time period after encryption of the portions of the key/post-encryption contextual data.

Figure 7:
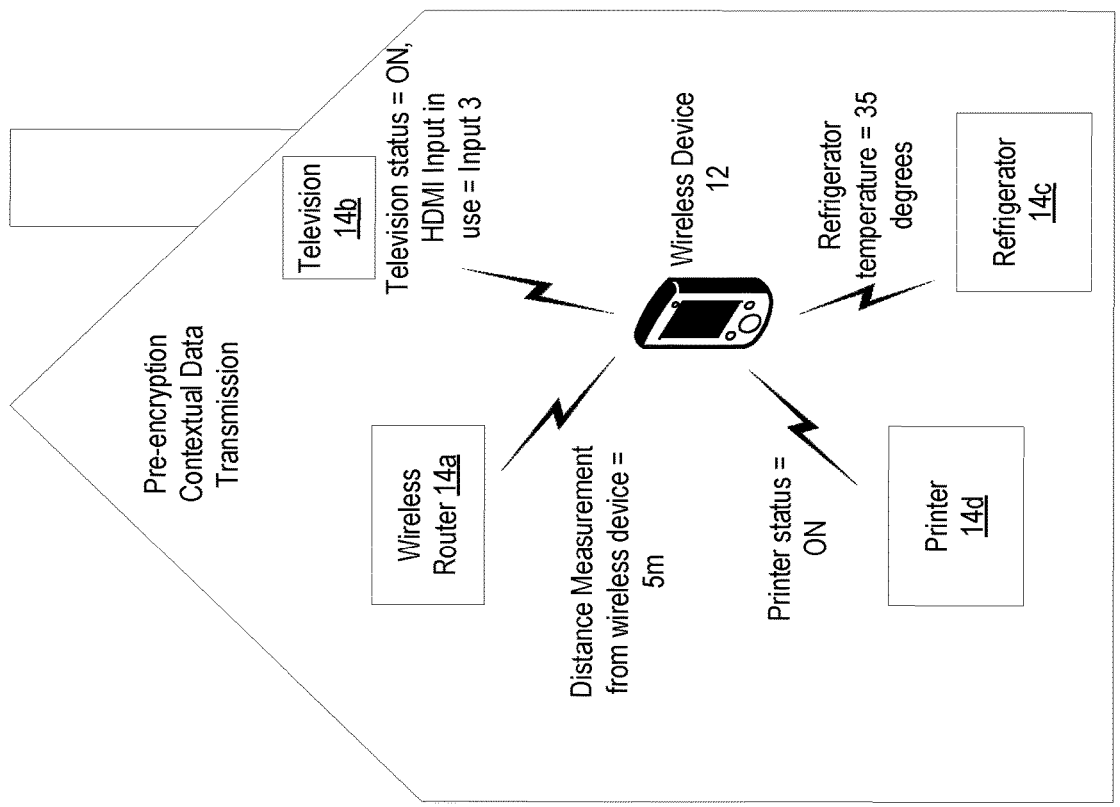
FIG. 7 is a block diagram of one implementation of the system for cryptographic key management in accordance with the principles of the disclosure.

FIG. 7 is a block diagram of one example of an implementation of system 10 in a premises environment where apparatus 12 is receiving pre-encryption contextual data as described in Blocks S102 and S120. In particular, in this embodiment, apparatus 12 is a wireless device that has been configured with key distribution code 22 and key regeneration code 24, and devices 14a-d are a variety of home appliances/entities such as (but not limited to) wireless router 14a, television 14b, refrigerator 14c and printer 14d that have been configured with contextual data code 34. As discussed above, the measurements and/or determinations used to generate contextual data may be triggered by one or more requests from apparatus 12. In the example of FIG. 7, wireless router 14a performed a measurement of the distance from wireless device 12 to determine pre-encryption contextual data, and transmit the results or indication of the results to apparatus 12. Further, television 14b performs two determinations, namely, determining television 14b's status and determining which HDMI input is in use, i.e., another status of television 14b. These determinations are transmitted to wireless device 12 for use in the key distribution process discussed above. Also, refrigerator 14c determines/measures the internal temperature of the refrigerator to be thirty-five degrees, and printer 14d determines its status to be "ON". These respective determinations of the refrigerator and printer are transmitted to wireless device 12. The pre-encryption contextual data received by wireless device 12 is used as inputs for encrypting respective portions of the key as described above with respect to Block S104.

Figure 8:
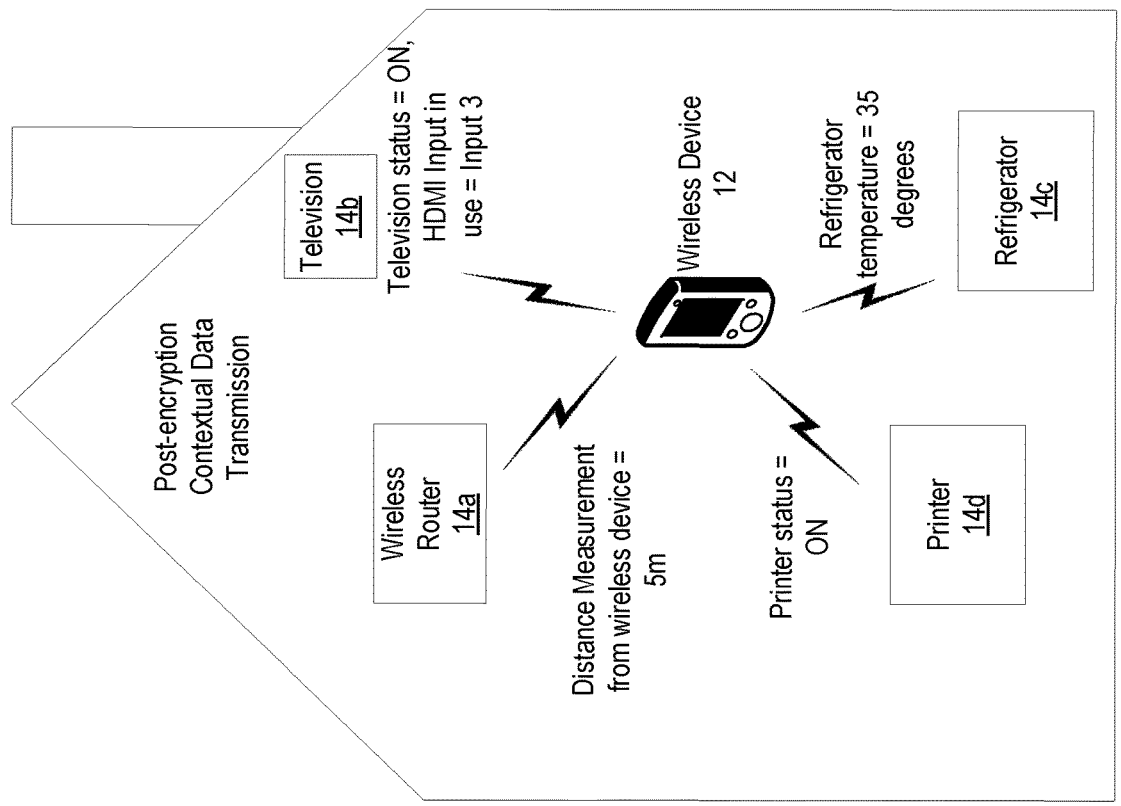
FIG. 8 is a block diagram of the system of FIG. 7 where post-encryption contextual data is being received in accordance with the principles of the disclosure.

FIG. 8 is a block diagram of the system of FIG. 7 but where apparatus 12 is receiving post-encryption contextual data, as generally described in Blocks S110 and S126. As discussed above, the measurements and/or determinations used to generate contextual data may be triggered by one or more requests from apparatus 12. In this example, apparatus 12 is requesting contextual data from the same location within the premises environment. For example, wireless router 14a performs a measurement of its distance from wireless device 12 using known methods in the art, which is the same when compared to the measurement associated with the pre-encryption contextual data illustrated in FIG. 6. In one or more embodiments, wireless device 12 performs the measurement with a pre-defined accuracy so as to allow slight variation without affecting whether the post-encryption contextual data is identical to the pre-encryption contextual data. In other words, wireless device 12 perform measurements and allows slight variation in the measurement such as by using ranges or "rounding off" measurements. For example, a measurement within the range 3 m to 5 m is set to equal 5 m, or a measurement of 3 m is round up to 5 m. In another example, a measurement within the range of 20-22 degrees Celsius is set to equal 20 degrees Celsius, or the measurement is rounded down to 20 degrees Celsius. Therefore, system 10 advantageously allows the level of access control using contextual data such as measurements to be "tweaked" or varied based on a pre-defined accuracy. Further, television 14b, refrigerator 14c and printer 14d also perform the same measurement(s)/determination(s) as discussed with respect to FIG. 7 but with these measurement(s)/determination(s) occurring later in time, i.e., after encryption of the portions of the key.

In one or more embodiments, if apparatus 12 is configured such that all pre-encryption contextual data must correspond to post-encryption contextual data for proper key reconstruction (where the key reconstruction corresponds to the key in Block S100), then the reconstructed key, in the example of FIGS. 7-8, will correspond to the original key or the key used in Block S100, as the measurements/determinations performed before and after encryption of the portion of the key correspond to each other, i.e., CPC(i)=5 meters corresponds to CPC(i)'=5 meters. In one or more other embodiments, if apparatus 12 is configured to use threshold security sharing such that a threshold amount (t) of pre-encryption contextual data must correspond to post-encryption contextual data for proper key reconstruction, i.e., where the reconstructed key equal the key used in Block S100, then the reconstructed key, in the example of FIGS. 7-8, will correspond to the original key or the key used in Block S100 as the threshold amount is met in this example. The threshold amount (t), as well as the total number of shares (n) are parameters of the utilized secret sharing scheme. The choice of these parameters thus defines a t-out-of-n secret sharing scheme where correct values for at least t of the n shares are required.

Figure 9:
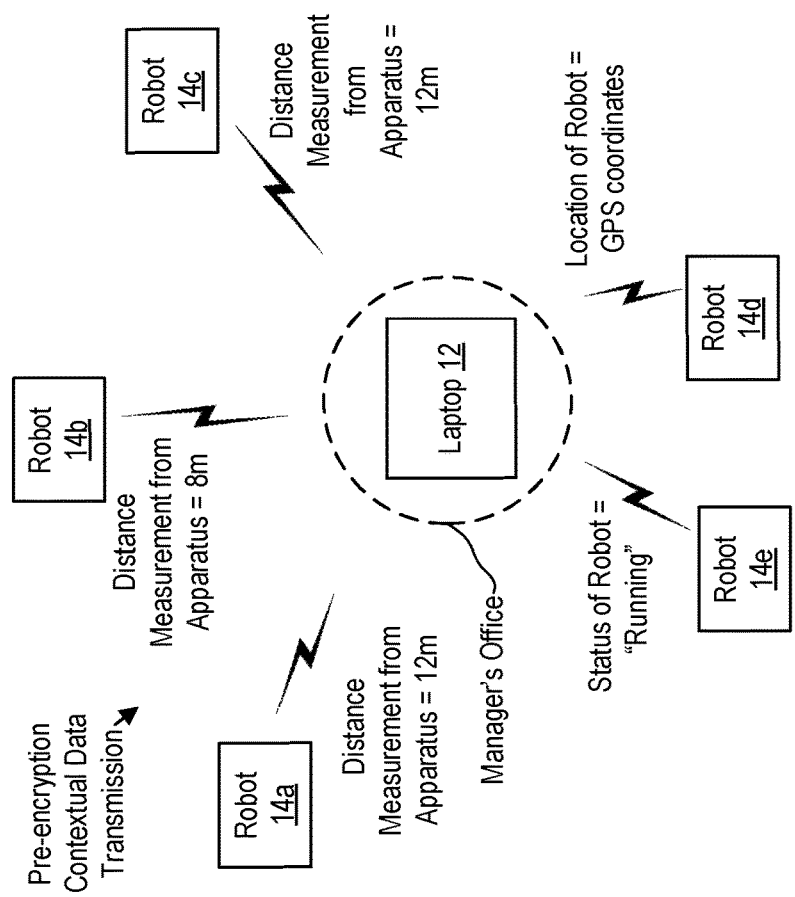
FIG. 9 is a block diagram of another implementation of system for cryptographic key management in accordance with the principles of the disclosure.

FIG. 9 is a block diagram of one implementation of system 10 in an industrial environment where apparatus 12 is receiving pre-encryption contextual data associated with Blocks S102 and S120. In particular, in this embodiment, apparatus 12 is a laptop associated with a manager/user in which laptop 12 has been configured with key distribution code 22 and key regeneration code 24, and devices 14a-d are one or more types of robots in the industrial environment that have been configured with contextual data code 34. As illustrated in FIG. 9, laptop 12 receives pre-encryption contextual data from robots 14a-14e. For example, robots 14a, 14b and 14c transmit respective distance measurements to laptop 12. Robot 14d transmits GPS coordinates of its location to laptop 12 while robot 14e transmits its status to laptop 12. Therefore, in this example, a key will be encrypted using this contextual data as inputs to a cryptographic function such as in equation 1, i.e., pre-encryption contextual data, as described in Block S104 such that reconstruction of the key will depend on whether laptop 12 is in the manager's office and/or other robot 14 attributes.

Figure 10:
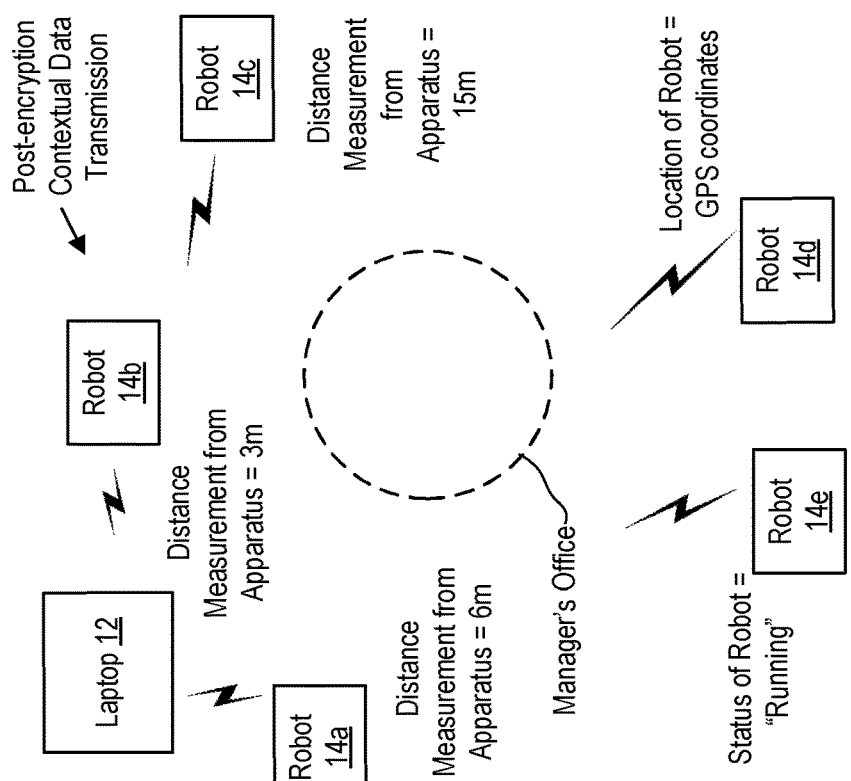
FIG. 10 is a block diagram of the system of FIG. 9 where post-encryption contextual data is being received in accordance with the principles of the disclosure.

FIG. 10 is a block diagram of the system of FIG. 9 but where laptop 12 is receiving post-encryption contextual data, as generally described in Blocks S110 and S126. In this example, laptop 12 is requesting post-encryption contextual data while outside the manager's office such that the contextual data measured and/or determined by respective robots 14a-14e may be different from FIG. 9. For example, robots 14a-14c report respective distance measurements from laptop 12 in which the results of the distance measurements taken by robot 14a-14c will be different from the measurements in FIG. 9 due to the change in location of laptop 12. However, robots 14d-14e, in this example, will report post-encryption contextual data that corresponds to the pre-encryption contextual data illustrated in FIG. 9 as robot 14d is in a location (that happens to be the same location as in FIG. 9) and robot 14e determines its current status is "running", which is the same status that was previously determined by robot 14e.

In one or more embodiments, if laptop 12 is configured such that all pre-encryption contextual data must correspond to post-encryption contextual data for proper key reconstruction, then the reconstructed key, in the example of FIGS. 9-10, will not correspond to the original key or the key used in Block S100, as the distance measurements performed by robots 14a-c before encryption (Block S104) or at a first time/time period, i.e., pre-encryption contextual data illustrated in FIG. 10, are different from the distance measurements performed by these robots after encryption (Block S104) or at a second time/time period, i.e., post-encryption contextual data.

However, in one or more other embodiments, if apparatus 12 is configured to use threshold security sharing such that a threshold amount (t) of pre-encryption contextual data must correspond to post-encryption contextual data for proper key reconstruction, then the reconstructed key, in the example of FIGS. 7-8, may correspond to the original key or the key used in Block S100 depending on the configured threshold. For example, if the threshold requires contextual data from three robots to match, i.e., three instances of CPC(i)==CPC(i)', then the threshold will not be met in the example of FIGS. 9-10. However, if the threshold is lower, the reconstructed key will correspond to the original key or the key used in Block S100 in the example, of FIGS. 9-10. In one or more embodiments, apparatus 12 uses one or more known methods for decrypting the portions of the key using post-encryption contextual data and encrypted portion of the key received from respective devices 14.

Figure 11:
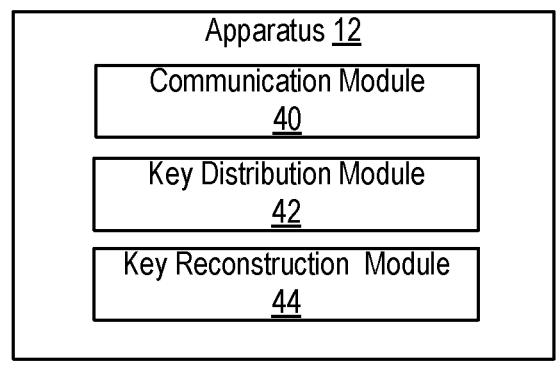
FIG. 11 is a block diagram of another embodiment of apparatus in accordance with the principles of the disclosure.

FIG. 11 is a block diagram of another embodiment of apparatus 12 in accordance with the principles of the disclosure. Apparatus 12 includes communication module 40 for performing communication functions described herein with respect to communication interface 16. Apparatus 12 includes key distribution module 42 for performing the key distribution process described in detail with respect to key configuration code 22 and FIGS. 2-3. Apparatus 12 includes key reconstruction module 44 for performing the key reconstruction process described in detail with respect to key reconstruction code 24 and FIGS. 5-6.

Figure 12:
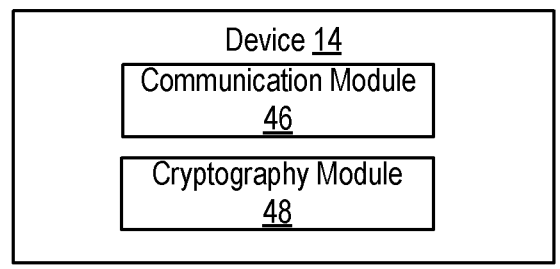
FIG. 12 is a block diagram of another embodiment of device in accordance with the principles of the disclosure.

FIG. 12 is a block diagram of another embodiment of device 14 in accordance with the principles of the disclosure. Device 14 includes communication module 46 for performing communication functions described herein with respect to communication interface 28. Device 14 includes contextual data module 48 for performing the storage and contextual data sharing process described herein with respect to contextual data code 34 and FIG. 6.

The encryption of the key shares takes into account contextual data such as contextual parameters or characteristics of the conditions under which access should be granted or a key operation performed. These contextual parameters may include physical measurements, statuses of device(s) and/or potential attributes, as discussed above, such as location, temperature, humidity, time-of-day, various actuator positions (e.g. a robot arm tilt) as described herein, . . . etc. Let cp1, cp2, . . . cpn be any subset of contextual parameters. In one or more embodiments, some of the contextual parameters may be of the same type, for example, cp7 and cp9 may both be positioning information, as perceived from two separate positioning devices 14a and 14b. Further, one or more contextual parameters may be generated "off-line" or "on-line". In one or more embodiments, off-line corresponds to the situation where a parameter is entered as a value or absolute value in Block S104 or in the key distribution process.

For example, as described above with respect to potential attribute(s), if it is known beforehand that a cryptographic key operation such as access control should only be granted when the environment temperature is exactly twenty degrees, then the value or potential attribute "20" is entered (twenty degrees can be the ambient temperature for enterprise during office hours) such that one portion of the encrypted key can only be decrypted if the environment temperature is twenty degrees when this attribute is measured by device 14. In one or more embodiments, on-line corresponds to the situation where the parameter is generated by an actually (physical) measurement by device 14 as described herein. For example, a temperature reading is performed by device 14, resulting in the value T in which T is used as an input to encrypt a portion of the key. In other words, this will mean that decryption of one or more key portions and subsequent key re-generation become possible under the "same" conditions or similar conditions (if a pre-defined accuracy is used as discussed above) such that contextual data corresponds to post-encryption contextual data. In contrast, an embodiment that incorporates only off-line generations corresponds to a situation where decryption of the encrypted key and possible reconstructions of the key will only be possible under pre-specified conditions. In one or more embodiments, a combination of off-line and on-line parameters may be used as discussed above.

In one or more embodiments, secure connections are established to different devices 14 at the time of key distribution and when contextual data is communicated from devices 14. Therefore, in one or more embodiments, the instant disclosure provides a method and system where apparatus 12, with the aid of devices 14, is required to reproduce the same contextual data when decryption of key portions takes place, else the correct key, i.e., a reconstructed key corresponding to the key in Block S100, will not be retrieved. Also, assuming the attacker does not know what contextual data was used when the encrypted key shares/portions were created, stealing of one or more of the encrypted key shares/portions from one or more devices 14 does not leak any information about the key unlike conventional secret sharing were stealing t (or more) shares would reveal the key.

Therefore, the instant disclosure advantageously provides a method and system for performing a cryptographic key operation, encrypting a key such as an access key and sharing (hiding) the access key among different authenticated devices 14 inside or associated with a premises such as a home or factory. In one or more embodiments incorporating a trusted or untrusted cloud, encrypted data is stored in one or more remote servers in the cloud such that the remote server stores both encrypted data and apparatus 12 and/or device 14 attributes. In one or more embodiments, the cryptographic key operation such as the encryption of data using the key may be performed by device 14, apparatus 12 or remote server in the network cloud. In one or more embodiments, the one or more remote servers of the network cloud "shadow" apparatus 12 and/or device 14 in that corresponding software components of the apparatus 12 and/or device 14 are executed at the remote server and mirror all information from the apparatus 12 and/or device 14 at the remote server. In other words, apparatus 12 and/or device 14 attributes/characteristics are stored at the remote server. Therefore, the cloud may store the result of a cryptographic key operation and the contextual data in the cloud at the same time. If contextual data is reproduced in the cyber-physical environment, then the cloud may perform cryptographic key operation described above such as decrypting the stored data or access control. In this embodiment, the cloud is trusted not to keep the result of the cryptographic key operation such as the decrypted data and only perform the cryptographic key operation if instructed by a user/entity and contextual data is reproduced by the user/entity.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An apparatus for cryptographic key management for managing access control, the apparatus comprising:
    processing circuitry, the processing circuitry including a processor and a memory, the memory containing instructions that, when executed by the processor, configure the processor to:
        divide a key into a plurality of portions of the key;
        receive pre-encryption contextual data for each of a plurality of devices, the pre-encryption contextual data indicating at least one attribute of a respective device of the plurality of devices before an encryption of the plurality of portions of the key is performed, the at least one attribute of the respective device including at least an environmental measurement and corresponding to at least one user provided potential attribute of the respective device, the at least one user provided potential attribute to be used when at least a portion of the pre-encryption contextual data is undeterminable by the respective device at least for a predetermined time interval and determined by the respective device at least one of after encryption of the plurality of portions of the key is performed and when post-encryption contextual data is requested;
        encrypt the plurality of portions of the key based at least on the pre-encryption contextual data of the plurality of devices to make the plurality of portions of the key dependent at least on contextual data corresponding pre-encryption contextual data; and
        distribute each of the plurality of encrypted portions of the key to a respective device of the plurality of devices for storage and retrieval.

2. The apparatus of claim 1, wherein the memory contains further instructions that, when executed by the processor, configure the processor to:
    perform a first cryptographic key operation using the key before dividing the key into the plurality of portions of the key.

3. The apparatus of claim 1, wherein each device of the plurality of devices receives the encrypted portion of the key that was encrypted using pre-encryption contextual data from the respective device.

4. The apparatus of claim 1, wherein the memory includes further instructions that configure the processor to:
    receive post-encryption contextual data for at least one of the plurality of devices, the post-encryption contextual data indicating at least one attribute of a respective device of the plurality of devices after the encryption of the plurality of portions of the key is performed;
    receive at least one of the plurality of encrypted portions of the key;
    generate a reconstructed key based on:
        the post-encryption contextual data for at least one of the plurality of devices; and
        the received at least one of the plurality of encrypted portions of the key; and
    the reconstructed key corresponding to the key when at least a portion of the post-encryption contextual data corresponds to the pre-encryption contextual data.

5. The apparatus of claim 4, wherein the reconstructed key corresponds to the key when a threshold number of encrypted portions of the key are received.

6. The apparatus of claim 5, wherein the reconstructed key corresponds to the key when at least a threshold amount of post-encryption contextual data corresponds to the pre-encryption contextual data.

7. The apparatus of claim 4, wherein the at least one attribute indicated by the post-encryption contextual data corresponds to at least one physical measurement performed by a respective device of the plurality of devices.

8. The apparatus of claim 4, wherein the at least one attribute indicated by the post-encryption contextual data corresponds to at least one status of a respective device of the plurality of devices.

9. The apparatus of claim 4, wherein the memory contains further instructions that, when executed by the processor, configure the processor to perform a second cryptographic key operation using reconstructed key when the reconstructed key corresponds to the key, the second cryptographic key operation being related to the first cryptographic key operation.

10. The apparatus of claim 9, wherein the second cryptographic key operation is configured to allow access to at least one resource associated with at least one device of the plurality of devices when the reconstructed key corresponds to the key.

11. The apparatus of claim 1, wherein the at least one attribute indicated by the pre-encryption contextual data corresponds to at least one of a physical measurement and status of device determination performed by a respective device of the plurality of devices.

12. A method for cryptographic key management for managing access control, method comprising:
    dividing a key into a plurality of portions of the key;
    receiving pre-encryption contextual data for each of a plurality of devices, the pre-encryption contextual data indicating at least one attribute of a respective device of the plurality of devices before an encryption of the plurality of portions of the key is performed, the at least one attribute of the respective device including at least an environmental measurement and corresponding to at least one user provided potential attribute of the respective device, the at least one user provided potential attribute to be used when at least a portion of the pre-encryption contextual data is undeterminable by the respective device at least for a predetermined time interval and determined by the respective device at least one of after encryption of the plurality of portions of the key is performed and when post-encryption contextual data is requested;

encrypting the plurality of portions of the key based at least on the pre-encryption contextual data of the plurality of devices to make the plurality of the portions of the key dependent at least on contextual data corresponding pre-encryption contextual data; and distributing each of the plurality of encrypted portions of the key to a respective device of the plurality of devices for storage and retrieval.

13. The method of claim 12, further comprising performing a first cryptographic key operation using the key before dividing the key into the plurality of portions of the key.

14. The method of claim 12, wherein each device of the plurality of devices receives the encrypted portion of the key that was encrypted using pre-encryption contextual data from the respective device.

15. The method of claim 12, further comprising:
receiving post-encryption contextual data for at least one of the plurality of devices, the post-encryption contextual data indicating at least one attribute of a respective device of the plurality of devices after the encryption of the plurality of portions of the key is performed;
receiving at least one of the plurality of encrypted portions of the key;
generating a reconstructed key based on:
the post-encryption contextual data for at least one of the plurality of devices; and
the received at least one of the plurality of encrypted portions of the key; and
the reconstructed key corresponding to the key when at least a portion of the post-encryption contextual data corresponds to the pre-encryption contextual data.

16. The method of claim 15, wherein the reconstructed key corresponds to the key when a threshold number of encrypted portions of the key are received.

17. The method of claim 16, wherein the reconstructed key corresponds to the key when at least a threshold amount of post-encryption contextual data corresponds to the pre-encryption contextual data.

18. The method of claim 15, wherein the at least one attribute indicated by the post-encryption contextual data corresponds to at least one physical measurement performed by a respective device of the plurality of devices.

19. The method of claim 15, wherein the at least one attribute indicated by the post-encryption contextual data corresponds to at least one status of a respective device of the plurality of devices.

20. The method of claim 15, further comprising performing a second cryptographic key operation using the reconstructed key when the reconstructed key corresponds to the key, the second cryptographic key operation being related to the first cryptographic key operation.

21. The method of claim 20, wherein the second cryptographic key operation is configured to allow access to at least one resource associated with at least one device of the plurality of devices when the reconstructed key corresponds to the key.

22. The method of claim 12, wherein the at least one attribute indicated by the pre-encryption contextual data corresponds to at least one of a physical measurement and status of device determination performed by a respective device of the plurality of devices.

23. A method for cryptographic key management for managing access control, method comprising:
performing a first cryptographic key operation using a key;
dividing the key into a plurality of portions of the key;
receiving pre-encryption contextual data for each of a plurality of devices, the pre-encryption contextual data indicating at least one attribute of a respective device of the plurality of devices before an encryption of the plurality of portions of the key is performed, the at least one attribute of the respective device including at least an environmental measurement and corresponding to at least one user provided potential attribute of the respective device, the at least one user provided potential attribute to be used when at least a portion of the pre-encryption contextual data is undeterminable by the respective device at least for a predetermined time interval and determined by the respective device at least one of after encryption of the plurality of portions of the key is performed and when post-encryption contextual data is requested;
encrypting the plurality of portions of the key based at least on the pre-encryption contextual data of the plurality of devices to make the plurality of the portions of the key dependent at least on contextual data corresponding pre-encryption contextual data;
distributing each of the plurality of encrypted portions of the key to a respective device of the plurality of devices for storage and retrieval;
receiving at least one of the plurality of encrypted portions of the key;
receiving post-encryption contextual data for at least one of the plurality of devices, the post-encryption contextual data indicating at least one attribute of a respective device of the plurality of devices after the encryption of the plurality of portions of the key is performed;
generating a reconstructed key based on the post-encryption contextual data for at least one of the plurality of devices and the received at least one of the plurality of encrypted portions of the key; and
performing a second cryptographic key operation using the reconstructed key when the reconstructed key corresponds to the key, the second cryptographic key operation being related to the first cryptographic key operation.

* * * * *